(12) United States Patent
Potter et al.

(10) Patent No.: US 7,872,588 B2
(45) Date of Patent: Jan. 18, 2011

(54) MONITORING TAGS

(75) Inventors: John Ian Potter, Leicestershire (GB);
Graeme Lindsay Jonathan Paterson,
Somerset (GB)

(73) Assignee: Guidance IP, Ltd., Leicester (GB)

( * ) Notice: Subject to any disclaimer, the term of this patent is extended or adjusted under 35 U.S.C. 154(b) by 81 days.

(21) Appl. No.: 12/256,241

(22) Filed: Oct. 22, 2008

(65) Prior Publication Data

US 2009/0051562 A1    Feb. 26, 2009

Related U.S. Application Data

(62) Division of application No. 11/194,390, filed on Aug. 1, 2005, now Pat. No. 7,612,678.

(51) Int. Cl.
*G08B 23/00* (2006.01)

(52) U.S. Cl. .............. 340/693.5; 340/572.8; 340/568.2; 340/573.1; 340/573.4; 24/16 PB; 2/338

(58) Field of Classification Search ............ 340/539.15, 340/572.8, 573.1, 568.2, 573.4, 693.5; 24/16 PB, 24/543, 3.12, 562, 302, 178, 72.1; 2/312, 2/336, 195.1, 338
See application file for complete search history.

(56) References Cited

U.S. PATENT DOCUMENTS

| | | | |
|---|---|---|---|
| 4,691,924 A | 9/1987 | Strong | |
| 5,013,908 A | 5/1991 | Chang | |
| 5,069,957 A | 12/1991 | Vandermeersch | |
| 5,184,274 A | 2/1993 | Weiss | |
| 5,374,921 A | 12/1994 | Martin et al. | |
| 5,471,197 A | 11/1995 | McCurdy et al. | |
| 5,523,740 A | 6/1996 | Burgmann | |
| 5,543,780 A | 8/1996 | McAuley et al. | |
| 5,650,766 A | 7/1997 | Burgmann | |
| 5,656,996 A | 8/1997 | Houser | |
| 5,680,104 A | 10/1997 | Slemon et al. | |
| 5,831,535 A * | 11/1998 | Reisman et al. | .......... 340/573.4 |
| 6,158,057 A | 12/2000 | Neumann | |
| 6,394,040 B1 * | 5/2002 | Axel | .......... 119/859 |
| 7,084,764 B2 | 8/2006 | McHugh et al. | |
| 2002/0130776 A1 | 9/2002 | Houde | |
| 2002/0190864 A1 | 12/2002 | Boccacci | |
| 2003/0174059 A1 | 9/2003 | Reeves | |
| 2006/0048275 A1 | 3/2006 | Cho | |

FOREIGN PATENT DOCUMENTS

WO        02073561        9/2002

* cited by examiner

*Primary Examiner*—Anh V La
(74) *Attorney, Agent, or Firm*—Rebecca J. Brandau

(57) ABSTRACT

The invention provides a monitoring tag for wearing about the appendage of an individual. It includes a self-contained transmitter module that is located in a housing and transmits radio signals to a base unit, for receipt by the base unit if within a predetermined range. If the individual wearing the monitoring tag moves outside this range then the base unit can trigger an alarm or send a warning signal. The housing has an opening for receiving the end of a flexible elongate strap to secure the tag around the appendage of the individual. The strap is attached to the housing inside the opening using a clip, which has structure for fixedly securing it to the strap and structure for fixedly securing it in the opening. Once the clip is attached to the housing it cannot be removed unless a weakened or frangible region between the securing structures is broken.

32 Claims, 10 Drawing Sheets

MONITORING TAGS

CROSS-REFERENCE TO RELATED APPLICATIONS

This application is a divisional of U.S. patent application Ser. No. 11/194,390, filed Aug. 1, 2005 now U.S. Pat. No. 7,612,678, which is hereby incorporated by reference and is assigned to assignee of the present invention.

BACKGROUND OF THE INVENTION

1. Field of the Invention

The present invention relates to monitoring tags, and in particular to tags that can be secured with a strap to an item so that a location or security status of the item can be monitored. For example, the monitoring tag might be secured around the appendage of an individual or animal, or to part of an object or item of merchandise.

2. Related Art

The monitoring tags of the present invention can include a location detection means for detecting if the item has moved outside a designated area within which a wireless signal can be exchanged between the monitoring tag and a base unit. As such, the tags can be worn by hospital patients, the elderly, children or offenders and can raise an alarm or notify an authorised person if they move outside the designated area. The tags can also be used in other situations such as stock control, employee location control or to detect if a valuable object has been moved, for example. The monitoring tags may include means to try and prevent tampering and where this is not possible, to provide an indication that tampering has taken place.

These tamper detection means can be provided in addition to, or instead of, the location detection means. The tamper detection means can be used to raise an alarm or notify an authorised person if the strap that is used to secure the monitoring tag is cut, detached from a housing of the tag or interfered with in any way.

Monitoring tags are known where a housing is secured around the appendage of an individual by means of a flexible elongate strap. The housing includes a radio frequency transmitter that can exchange signals with a base unit. Such communication between the monitoring tag and the base unit can only take place when the monitoring tag is within range. Consequently, if the monitoring tag is taken too far away from the base unit then the communication will cease. The lack of communication can be automatically recorded or logged by the base unit or the base unit can trigger an alarm or notify an interested party.

The housing can also include a tamper detection circuit. A typical tamper detection circuit might include an optical transmitter for sending optical signals along an optical fibre (sometimes called a fibre-optic cable) embedded in the strap. If the strap is intact and properly secured to the housing then the optical signals will travel along the optical fibre and can be detected at the other end by an optical receiver. However, tampering with the strap by cutting it or detaching it from the housing will interrupt the optical signal and trigger the optical tamper detection circuit.

One known way of trying to remove the monitoring tag is to heat the strap and stretch it. In many cases the optical fibre will stretch with the rest of the strap so there is no critical interruption of the optical signal. To prevent this from happening, a thread, yarn, braid or tape of a thermally inelastic material such as Kevlar® material (supplied by DuPont Corporation of Wilmington, Del., United States of America) can be embedded in the strap. However, the applicant has found that unless this thread, yarn, braid or tape is mechanically bonded to the rest of the strap and/or mechanically secured to the housing (either directly or indirectly through the clips mentioned below) then it is still possible to stretch the strap because there is relative movement between the thermally inelastic material and the surrounding material of the strap.

The strap is usually made a snug but comfortable fit around the appendage of the individual. The strap must also be capable of being detached from the housing in case of an emergency or when the monitoring tag is legitimately removed. The strap is therefore often provided in a single piece and secured to the housing a pair of clips. The applicant has found that it is not always obvious if the clips have been tampered with in an attempt to remove the monitoring tag.

The applicant has also found that known monitoring tags may suffer from problems caused by the ingress of liquids through openings in the housing for receiving the ends of the strap or the clips. If the liquid gets between the ends of the optical fibre and the optical transmitter or optical receiver of an optical tamper detection circuit then it can interfere with the proper detection of the optical signal, thereby causing the optical tamper detection circuit to trigger unnecessarily. The liquid can also damage the optical fibres and the other electronic components inside the housing.

SUMMARY OF THE PRESENT INVENTION

All of the problems mentioned above are solved by the monitoring tags according to the present invention.

An object of the present invention is to provide a strap for a monitoring tag that cannot be stretched because it contains a thread, yarn, braid or tape of thermally inelastic material that is mechanically bonded to the surrounding material. In accordance with this object, an embodiment of the present invention is provided by an elongate flexible strap for securing a monitoring tag to an item, the strap incorporating a thermally inelastic thread, yarn, braid or tape that is mechanically bonded to the surrounding material of the strap.

The strap can, for example, be used to secure the monitoring tag to the appendage of an individual or animal, or to part of an object or item of merchandise. The monitoring tag can then be used to monitor the location of the item (optionally with reference to its distance from a base unit) by incorporating a location detection means such as a transmitter module. The strap can also be used to secure the monitoring tag to an item in such a way that it cannot be removed from the item without being cut or separated from a housing of the monitoring tag. In this case, the monitoring tag will preferably include a tamper detection means to detect if the strap or the housing has been tampered or interfered with. For example, the monitoring tag can be used to secure an expensive item of merchandise on open display in a shop to a fixed metal cable. The strap is passed through a loop or opening in the item of merchandise and around the cable before the ends of the strap are secured to a housing of the monitoring tag. The item of merchandise cannot be released from the cable without cutting the strap or detaching an end of the strap from the tag. These actions would be detected by the tamper detection means and an audible alarm can be sounded to alert a shop assistant or security staff that tampering is taking place. In some situations, at least one end of the strap can be secured to the housing of the monitoring tag with a releasable locking mechanism so that the strap can be released from the housing by a shop assistant when the item of merchandise is purchased or so that it can be inspected more closely by a member of the public.

The location detection means and the tamper detection means are described in more detail below.

The strap can formed from a thermoplastics material or a rubber material such as silicone rubber. Examples of a suitable thermoplastics material would include Elastollan® (a thermoplastics polyurethane (TPU) supplied by BASF Corporation of Florham Park, N.J., United States of America) and Santoprene® (a thermoplastic elastomer (TPE) supplied by Advanced Elastomer Systems, L.P. of Akron, Ohio, United States of America).

The thread, yarn, braid or tape is preferably formed from a hybrid mixture of a thermally inelastic material and a bonding material that is capable of forming a chemical bond with the surrounding material of the strap thereby locking the thermally inelastic material in position within the strap. The bonding material may also form a chemical bond with the thermally inelastic material.

One or more threads of thermally inelastic material can be embedded in the strap and each of these can be coated or impregnated with a bonding material.

Two or more individual threads can also be twisted together to form a yarn. The yarn can include one or more individual threads of thermally inelastic material and one or more individual threads of bonding material. The twisted yarn can also be formed from individual threads of thermally inelastic elongated material treated, such as by being coated or impregnated, with a bonding material.

The yarn can be used to form a woven braid. In a particularly preferred aspect, the yarn includes a mixture of threads made of a thermally inelastic material and threads made of a bonding material. However, it is also possible to form a woven braid from a mixture of threads or yarns made entirely of thermally inelastic material and threads or yarns made entirely of a bonding material, or from threads or yarns of thermally inelastic elongated material treated (e.g. coated or impregnated) with a bonding material.

The woven braid may have a loose weave so that holes are provided between the warp and weft threads. If the braid is embedded in the strap when the strap is fluid or molten then the surrounding material of the strap can flow through and into these holes so that a stronger mechanical bond is produced. Elevated temperatures experienced during the manufacturing process can assist or initiate in the formation of a strong chemical bond between the bonding material and the surrounding material of the strap.

Elongate tapes can be formed from layers of a thermally inelastic material and a bonding material, or from a flat tape of thermally inelastic material that is coated or impregnated with a bonding material, for example.

The thermally inelastic material can be an organic polymer such as a Kevlar® material supplied by the DuPont Corporation of Wilmington, Del., United States of America. Alternative thermally inelastic materials include Nomex® (also supplied by the DuPont Corporation), glass fibre, carbon fibre, steel and tungsten. The bonding material is preferably viscose but other suitable materials can also be used. The choice of the bonding material may depend on the material used to form the strap because of the need to form a chemical bond between the two different materials.

The strap can also incorporate an optical fibre. The strap has two ends and the optical fibre is preferably embedded in the strap such that it extends from one end of the strap to the other. The optical fibre is intended to be used as part of an optical tamper detection circuit (tamper detection means) where optical signals from an optical transmitter located at one end of the strap are sent down the optical fibre and are detected by an optical receiver located at the other end of the strap. The optical transmitter, optical receiver and optical fibre together define a closed optical pathway. At least one of the optical receiver and the optical receiver can be located inside a housing of the monitoring tag. The optical tamper detection circuit is designed to be triggered if the strap is tampered with to the extent that the optical pathway is interrupted, either because the strap (and hence the optical fibre) has been cut or because at least one end of the strap has been detached from the housing. In the latter case, it will be appreciated that the optical signals will no longer be coupled into or out of the optical fibre.

It is generally preferred that two separate thermally inelastic threads, yarns, braids or tapes are embedded in the strap, one on either side of the optical fibre. Each thread, yarn, braid or tape preferably extends from one end of the strap to the other.

Each end of the strap can be secured to a housing of the monitoring tag using a clip. As described in more detail below, the clip is preferably adapted and configured so that once it has been secured to the housing it cannot be removed without providing a visual indication that removal or tampering has taken place. This might include a clip that has to be physically broken into two or more separate parts before it can be released from the housing, for example.

The mechanical bond formed between the thermally inelastic thread, yarn, braid or tape and the surrounding material prevents the strap from stretching when it is heated. This is because there can be no relative movement between the thread, yarn, braid or tape and the surrounding material of the strap. The applicant has found that in known straps the relative movement between the thread, yarn, braid or tape and the rest of the strap tends to be most pronounced in the regions adjacent the ends of the strap. For additional protection against tampering, it is therefore generally preferred that the ends of the thread, yarn, braid or tape are mechanically or otherwise fixedly secured to the clips. Possible ways of securing the ends of the thermally inelastic thread, yarn, braid or tape to the clips are described in more detail below.

Another object of the present invention is to provide a monitoring tag having a housing and a strap and wherein the clips that are used to fix the ends of the strap to the housing include tamper evident features so that it is obvious on casual inspection that tampering has taken place. In accordance with this object, an embodiment of the present invention is provided by a monitoring tag including a housing having a first opening, an elongate flexible strap for securing the housing to an item, the strap having a first end and a second end, and a first clip having first structural means for fixedly securing the first clip to the first end of the strap and second structural means for fixedly securing the first clip in the first opening and wherein the first and second securing structure are connected together by a weakened or frangible region.

The second end of the strap can be fixedly secured directly to a part of the housing. However, it is generally preferred that the housing further includes a second opening and the monitoring tag further includes a second clip having first means for fixedly securing the second clip to the second end of the strap and second means for fixedly securing the second clip in the second opening and wherein the first and second securing means are connected together by a weakened or frangible region.

The first and second clips preferably have the same construction and it will be readily appreciated that all references below to "the clip" can apply equally to the first clip and the second clip.

The clip preferably includes an opening for receiving an end of the strap. To attach the monitoring tag around the appendage of an individual, for example, the clip is slid over the end of the strap and fixedly attached thereto by the first securing means. The strap is then placed around the appendage and the clip is inserted into the opening in the housing. The clip is fixedly secured in the opening in the housing by the second securing means. The clip is preferably designed so that once it is secured in the opening of the housing it cannot be removed without breaking the weakened or frangible region between the first and second securing means.

It will be readily appreciated that similar steps can be taken to secure the monitoring tag to part of an object or item of merchandise, for example.

The second securing means can be a pair of resilient barbs located on the edges of the clip and adapted to have a "one-way" snap fit engagement with correspondingly aligned locking recesses or channels provided on inside surfaces of the opening in the housing. Each barb is preferably formed as part of an edge part of the clip. The edge parts lie alongside the edges of the strap when the end of the strap is received through the opening in clip. Other suitable methods of permanent and semi-permanent fixing can also be used.

The first securing means can include a first plate part having at least one hole and a separate locking member having at least one projection that is received as a friction fit through the at least one hole in the first plate part and through at least one correspondingly aligned hole in the end of the strap. The clip may further include a second plate part positioned opposite the first plate part such that when the end of the strap is received through the opening in the clip the first and second plate parts lie alongside the planar surfaces of the strap. The second plate part preferably has at least one hole for receiving at least one projection of the separate locking member. It will therefore be readily appreciated that the at least one projection of the locking member extends in sequence through the at least one hole in the first plate part of the clip, the at least one hole in the end of the strap and the at least one hole in the second plate part of the clip.

It is generally preferred that the locking member includes four projections arranged in a substantially rectangular configuration. In this case, the second plate part of the clip and the end of the strap also preferably include four holes arranged in the same substantially rectangular configuration. However, the first plate part of the clip may be provided with only two holes and the locking member can be adapted to include a surface that comes into contact with the facing planar surface of the strap when the locking member is assembled to the rest of the clip (that is when the projections are properly fitted through the holes in the first plate part, the holes in the end of the strap and the holes in the second plate part). The surface of the locking member can include a plurality of ridges or teeth that grip the planar surface of the strap in use. Similar ridges or teeth can be provided on a surface of the second plate part that comes into contact with the opposite planar surface of the strap. Suitably located ramps or ridges can be provided in the opening of the housing such that the plurality of ridges or teeth on the contact surfaces of the locking member and the second plate part of the clip are forced into the planar surfaces of the strap with increasing force as the clip is pushed into the opening. This frictional engagement between the contact surfaces of the locking member and the second plate part on the one hand, and the planar surfaces of the end of the strap on the other hand, secures the clip to the end of the strap and can be used instead of, as opposed to in addition to, the at least one projection of the locking member. It also helps to prevent an individual from inserting a thin probe or the like through the gap between the outer surface of the strap and the contact surface of the second plate part or the locking member.

The locking member of the clip is received inside the opening in the housing once the clip has been fixedly secured in position inside the opening. This means that the locking member cannot be tampered with or released after the monitoring tag has been secured to the item.

If the strap includes a thermally inelastic elongated material, such as thread, yarn, braid or tape, to prevent the strap from being stretched when heated then it is preferred (as mentioned above) that the ends of the thread, yarn, braid or tape are mechanically secured to the clips. The following method is normally only possible for a braid or tape because its width must be greater than the diameter of the hole provided in the end of the strap. However, where possible, the at least one hole in the end of the strap also extends through the thermally inelastic braid or tape such that the at least one projection of the locking member extends through the end of the braid or tape. If the locking member has four projections arranged in a substantially rectangular configuration and the strap has two thermally inelastic braids or tapes then each braid or tape can include a pair of spaced holes for receiving a respective pair of the projections.

The only way to remove the strap from the monitoring tag is to apply sufficient force to the strap to break the weakened or frangible region between the first and second securing means. The weakened or frangible region can break in an emergency situation such as if the strap gets caught around a moving vehicle or object, for example. The weakened or frangible region can also be broken when the monitoring tag is removed by, or under the surveillance of, an authorised person. (The preferred mode of removal is to cut through the strap near its centre and then remove the clips and the attached parts of the strap by breaking them). However, if the monitoring tag is tampered with to such an extent that the clip is partially or completely broken then this will be immediately obvious to an observer. This is true even if attempts are made to try and glue or fix the parts of the clip back together. Breaking the clip may also trigger an optical tamper detection circuit where an optical fibre is embedded in the strap.

This mode of breaking the clip allows the monitoring tag to remain undamaged and it may be reused many times with a new strap and clips.

The frangible (weakened) region of the clip is preferably defined by substantially v-shaped channels formed in parts of the clip between the first securing means and the second securing means. V-shaped channels are preferred because they can define a line fracture in the annular member and flange. However, it will also be readily appreciated that the end of the channel can be rounded (u-shaped) or square. More particularly, the clip preferably includes four channels, a first channel extending between one side of the second plate part and a first edge part of the clip on which a barb is located, a second channel extending between the other side of the second plate part and a second edge part of the clip on which a barb is located, a third channel extending between one side of the first plate part and the first edge part of the clip and a fourth channel extending between the other side of the first plate part and the second edge part of the clip. The channels preferably extend up to and slightly into a peripheral flange that extends completely around the opening for receiving the end of the strap. The flange is formed in the end of the clip that is visible when the clip is inserted into the opening in the housing. The mouth of the opening in the housing preferably includes a peripheral recess for accommodating the flange. The flange is designed to prevent an individual from inserting a thin probe or the like down the gap between the outer surface of the clip and the inner surface of the associated opening in the housing. The weakened or frangible region can be identified as the narrow regions of the flange that extend from the ends of the v-shaped channels between the first and second plate parts and the first and second edge parts of the clip.

When the narrow regions of the flange are broken, the clip is separated into four parts, namely the first edge part, the first plate part, the second plate part and the second edge part. The first and second plate parts of the clip will usually remain attached to the end of the strap but the absence of any connection between the first and second securing means releases the end of the strap from the housing. This in turn may trigger an optical tamper detection circuit. Because the narrow regions extend through the part of the clip that is visible in use, it is not possible to glue or fix the separate parts back together without providing a visual indicator that the clip has been broken or tampered with.

Elongate ribs or projections can be provided on the inside of the opening in the housing such that they are located or received in the substantially v-shaped channels when the clip is fixedly secured in the opening. The elongate ribs or projections prevent the channels from closing when a force is applied to the strap. Otherwise, there is a small risk that the narrowing of the channels might allow the barbs to come out of engagement with the corresponding locking recesses or channels.

It is generally preferred that the weakened or frangible region is not visible once the clip has been fixedly secured in the opening in the housing. This is to prevent the individual wearing the monitoring tag from being aware of its existence. The channels can be bridged by thin webs at a point spaced apart from the weakened or frangible region. More particularly, a first generally u-shaped web can extend from one side of the second plate part to the first edge part of the clip and a second generally u-shaped web can extend from the other side of the second plate part to the second edge part of the clip. The webs are preferably adapted to extend substantially perpendicular to the outer planar surface of the second plate part. The webs improve the strength and rigidity of the clip just to the extent that the weakened or frangible region remains intact as the clip is inserted into the opening in the housing. As the clip is inserted, the thin webs are preferably folded down parallel to the outer planar surface of the second plate part. This folding action weakens the webs so that they provide no resistance to the separation of the clip into different pieces when the weakened or frangible region is broken.

The weakened or frangible region will always break before the first or second securing means. The amount of force needed to break the weakened or frangible region can be selected so that it will remain intact during normal usage of the monitoring tag.

Another object of the present invention is to provide a monitoring tag where a substantially water-tight seal is formed around the ends of the strap. In accordance with this object, an embodiment of the present invention is provided by a monitoring tag including a housing having an opening, and a strap having an end, wherein a water-tight seal is formed around the end of the strap by a providing an interference compression fit of the end of the strap into the opening in the housing.

A related embodiment of the present invention is provided by a monitoring tag including a housing having an opening, a strap having an end, and a cap (optionally optically-transparent if the monitoring tag includes an optical tamper detection circuit with an optical fibre embedded in the strap, an optical transmitter and an optical receiver) for receiving the end of the strap, wherein the cap is welded to the housing inside the opening and a water-tight seal is formed around the end of the strap by a providing an interference compression fit of the end of the strap into the cap.

If the monitoring tag includes an optical tamper detection circuit then the cap may include a curved lens part aligned with an end of the optical fibre for coupling the signals from the optical transmitter into the optical fibre or for coupling the signals from the optical fibre to the optical receiver.

In all cases mentioned above, the monitoring tag may include location detection means, preferably in the form of a self-contained transmitter module consisting of a transmitter circuit, a battery and an antenna. The transmitter circuit and the antenna may be tuned to send or receive electromagnetic signals at a particular frequency or a range of frequencies. The monitoring tag may also include a tamper detection circuit such as an optical tamper detection circuit with an optical transmitter and an optical receiver. The circuit components can be mounted on a standard printed circuit board (PCB).

These and other features and advantages of the invention may be readily appreciated from the following detailed description of the preferred embodiments and by reference to the accompanying drawings.

BRIEF DESCRIPTION OF THE DRAWINGS

Throughout the drawings like parts are indicated by like element numbers.

DETAILED DESCRIPTION OF PRACTICAL EMBODIMENTS

Although the present invention will now be described with reference to a monitoring tag that is secured around the ankle of an individual, it will be readily appreciated that the monitoring tag can be secured to any suitable item and may be used for purposes other than monitoring the location of the tag relative to a base unit.

Figure 1:
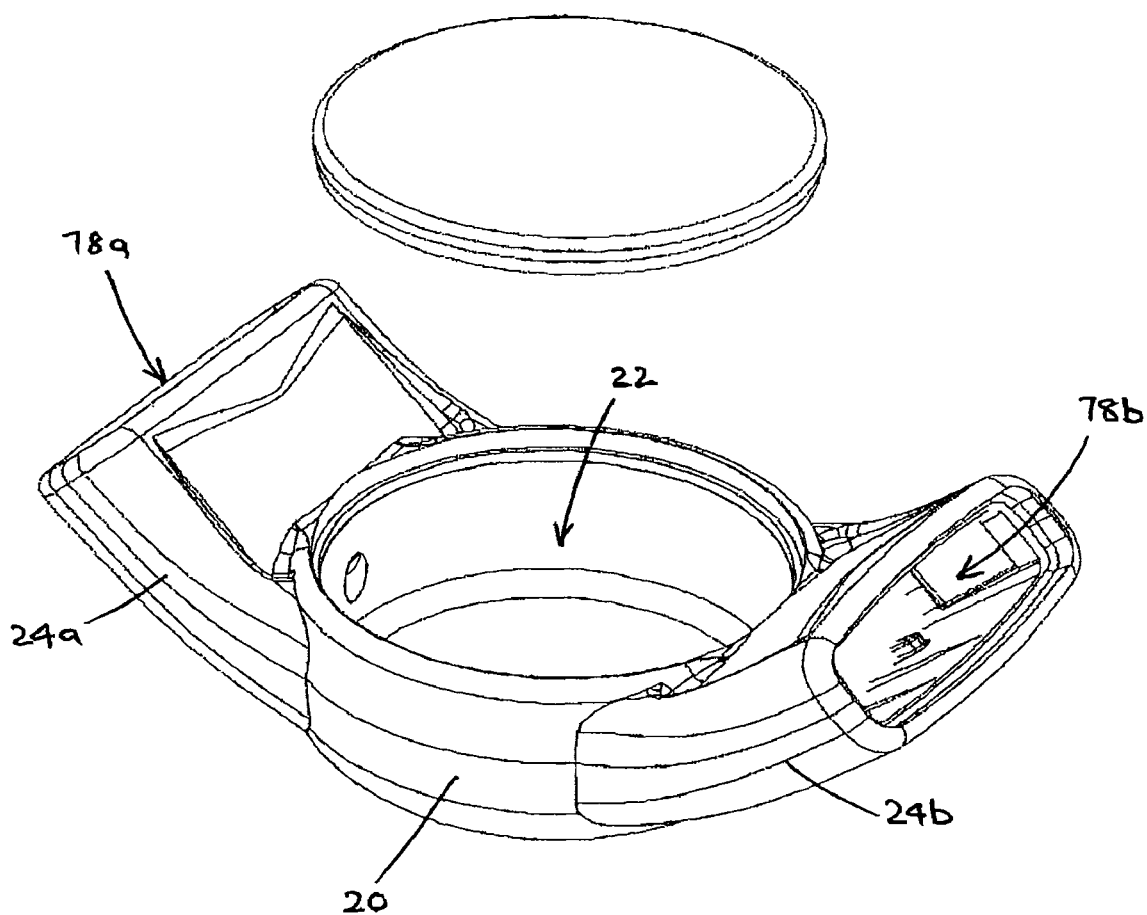
FIG. 1 is a side view of a housing of a monitoring tag according to the present invention.

FIG. 1 shows a monitoring tag including a housing 20 having a central cavity 22 and pair of oppositely extending arms 24a and 24b. The cavity 22 is sized and shaped to receive a self-contained transmitter module (not shown) in a particular orientation. The transmitter module includes an antenna and control and tamper detection circuitry mounted on a printed circuit board. Signals are transmitted by the antenna to a base unit (not shown) but they are only received when the monitoring tag is a within a certain range. If the individual wearing the monitoring tag moves too far away from the base unit then the signals transmitted by the antenna will no longer be received and this can be logged or recorded by the base unit. The base unit can also trigger an alarm or automatically notify an authorised person. The optical tamper detection circuit includes an optical transmitter 8 (see FIGS. 6 and 10) (optionally a light emitting diode (LED)) and an optical receiver (not shown) (optionally a photodiode detector).

Figure 2:
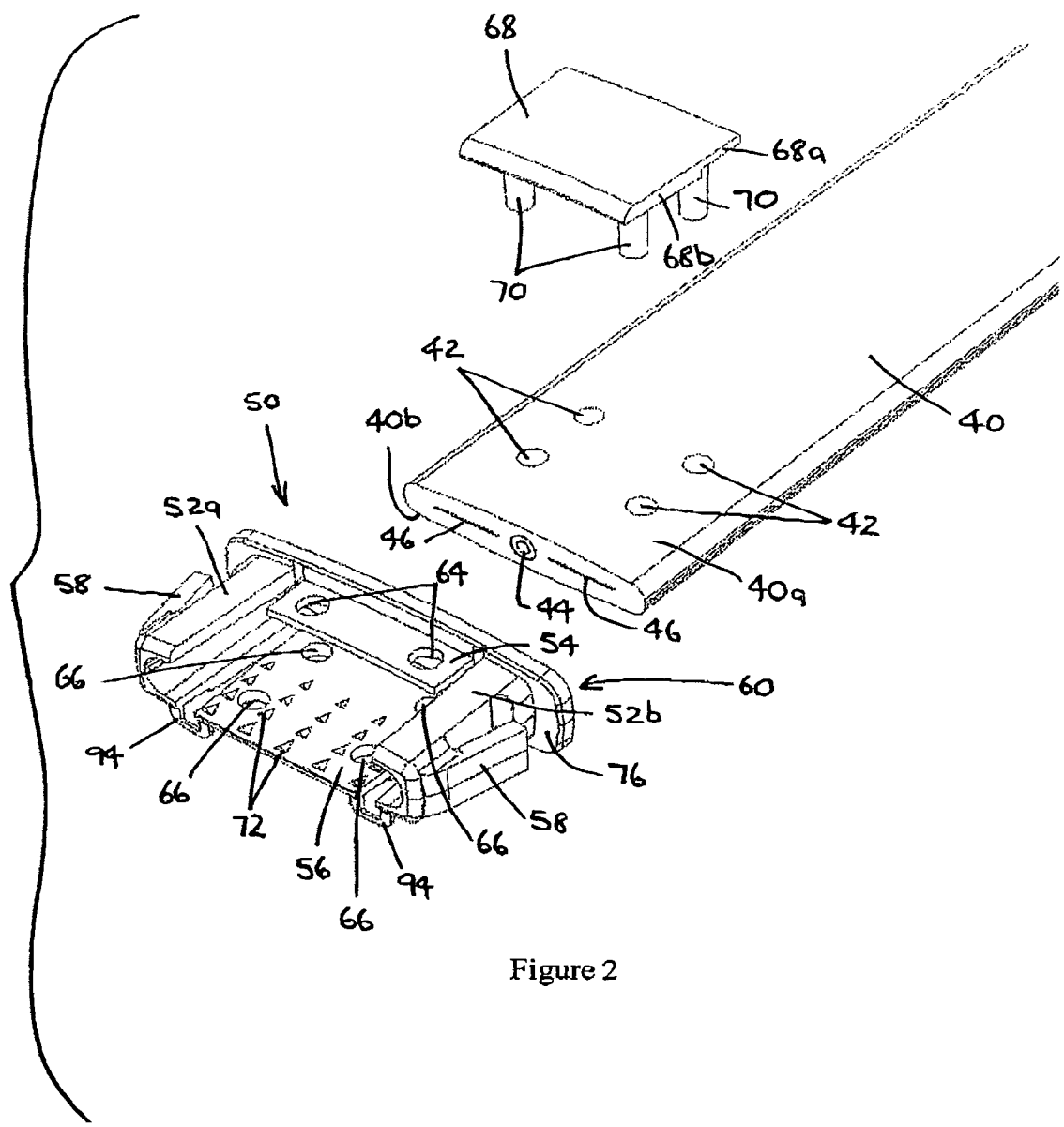
FIG. 2 is a perspective view showing how a clip is secured to an end of a flexible elongate strap using a locking member.

With reference to FIG. 2, the housing 20 is secured around the ankle of the individual (not shown) using a flexible elongate strap 40 made of a Elastollan® (a thermoplastics polyurethane (TPU) supplied by BASF Corporation of Florham Park, N.J., United States of America). The strap 40 is provided in a number of different lengths and both ends of the strap include a series of four holes 42 arranged in a rectangular configuration. The strap 40 is about 2.2 centimeters (⁷⁄₁₈ inch) wide and about 0.4 centimeters (⁵⁄₃₂ inch) thick.

An optical fibre 44 is embedded in the strap 40 in a central region and extends from one of the strap to the other. A series of optical signals from the optical transmitter 8 are coupled into one end of the optical fibre 44 and then coupled out from the other end of the optical fibre to the optical receiver (not shown). If the strap is cut or detached from the housing 20 then the transmission of the optical signals along the optical fibre 44 is disrupted and the optical tamper detection circuit is triggered.

Figure 3:
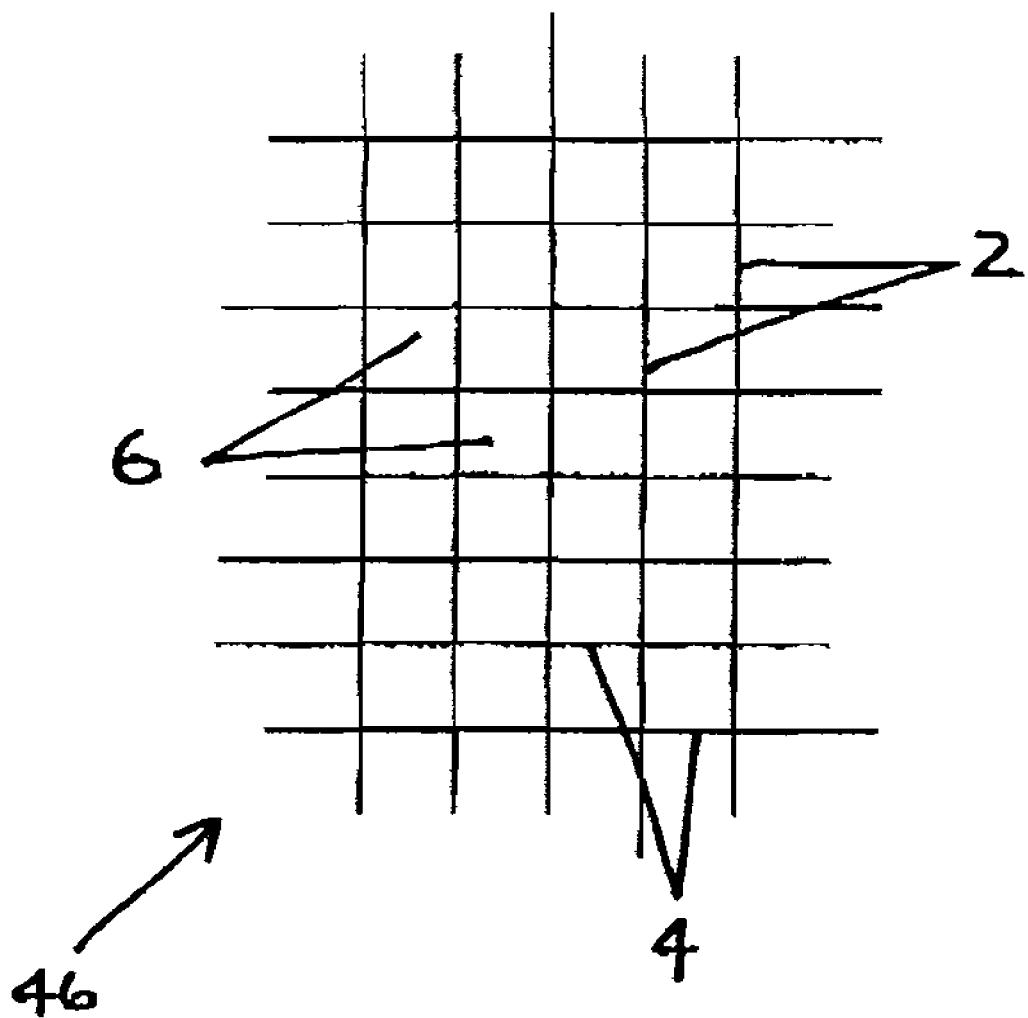
FIG. 3 is a magnified view showing the construction of a woven braid embedded in the flexible elongate strap of FIG. 2.

Two woven braids 46 are embedded in the strap 40 on either side of the optical fibre 44. With reference to FIGS. 2 and 3, each of the braids 46 (FIG. 2) is formed from warp yarns 2 and weft yarns 4. Each of the warp yarns 2 is formed from individual threads of Kevlar® (supplied by the DuPont Corporation of Wilmington, Del., United States of America) and the same number of individual threads of viscose twisted together. The weft yarns 4 have the same construction. The weave is loose so that holes 6 are provided between the various warp yarns 2 and the weft yarns 4. The braids 46 are embedded in the strap during the manufacturing process when the TPU material is still molten. The TPU material therefore flows into the holes 6 in the braids 46 and the elevated temperature causes the viscose threads to form a strong chemical bond with the surrounding TPU material. The result is that the Kevlar® threads, that are twisted together with the viscose threads, are locked firmly in place inside the strap so that they cannot move relative to the surrounding TPU material if anyone tries to stretch the strap.

Figure 4:
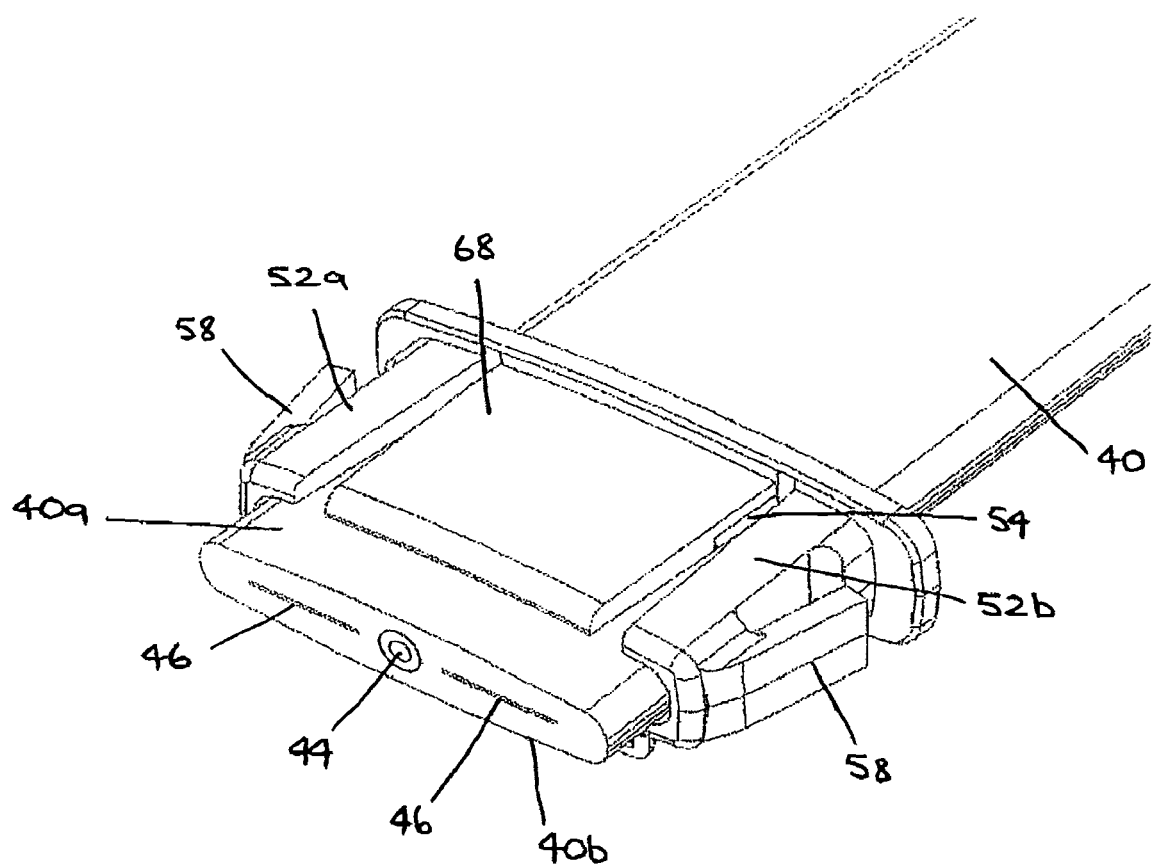
FIG. 4 is an end perspective view of the clip of FIG. 2.
Figure 5:
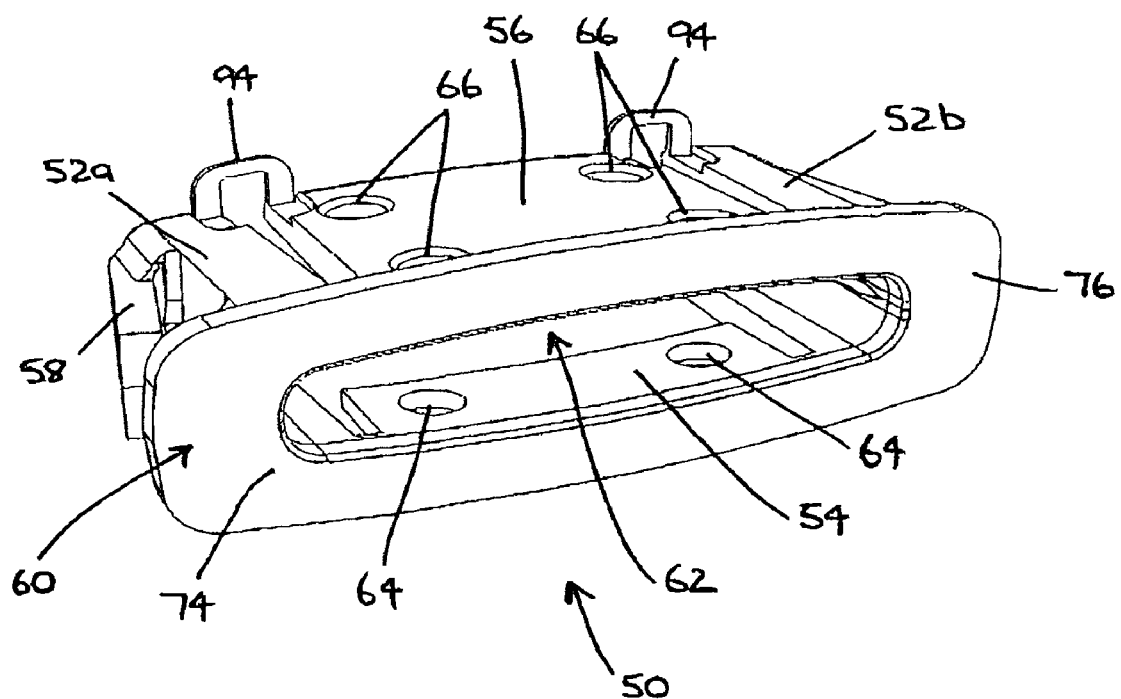
FIG. 5 is an end perspective view of the clip of FIG. 2 showing the opening for receiving an end of the flexible elongate strap, the annular member and the flange.

The ends of the strap 40 are secured to the arms 24a and 24b of the housing 20 using integrally-formed plastic clips 50. Each clip 50 includes a pair of edge parts 52a and 52b, a first plate part 54 and a second plate part 56. Each of the edge parts 52a and 52b includes a resilient engaging barb 58. A front part 60 of the clip 50 includes an opening 62 (best seen in FIG. 5) for receiving an end of the strap 40. When the clip 50 is located on the end of the strap 40 as shown in FIG. 4, the edge parts 52a and 52b are positioned alongside the rounded sides of the strap 40 and the first plate part 54 and the second plate part 56 are positioned alongside the planar surfaces 40a and 40b of the strap.

The first plate part 54 includes a pair of holes 64. The second plate part 56 includes four holes 66 arranged in a rectangular configuration. When the end of the strap 40 is received through the opening 62, the four holes 42 are aligned with the four holes 66 in the second plate part 56. The pair of holes in the strap 40 that are located furthest away from the end of the strap are also aligned with the pair of holes 64 in the first plate part 54. A clip 50 can therefore be secured to each end of the strap 40 using a locking member 68. The locking member 68 has a substantially planar part with four extending projections or pins 70 arranged in a rectangular configuration. These pins 70 are a clearance fit through the pair of holes 64 in the first plate part 54, a press fit through the four holes 42 in the end of the strap 40 and are finally received in the four holes 66 in the second plate part 56. The holes 42 in the strap 40 also extend through the ends of the woven braids 46 so that the braids are mechanically secured to the clips 50 once the locking member 68 is engaged. The pins 70 of the locking member 68 can be made of a plastics material or made of metal. The latter is preferred in some situations where there is a risk that a sharp object such as a knife or blade might be inserted between the planar surface 40a of the strap and the locking member 68 to cut through the pins 70 and release the strap from the housing 20. If the remainder of the locking member 68 is made of a plastics material then moulded metal pins can be inserted in the plastics part. Alternatively, the whole of the locking member 68 can be made of a metal such as die cast aluminium.

The surface of the substantially planar part of the locking member 68 facing the strap 40 in use has a stepped configuration such that a narrow part 68a comes into contact with an outer surface of the first plate part 54 and a wide part 68b comes into contact with the planar surface 40a of the strap. The wide part 68b includes a number of ridges or teeth 68c (FIG. 13) that press into the planar surface 40a of the strap. The inner surface of the second plate part 56 also has a number of ridges or teeth 72 that press into the other planar surface 40b of the strap.

The edge parts 52a and 52b of the clip 50 are connected to each other and to the first and second plate parts 54 and 56 by an annular member 74 (best seen in FIG. 5) that extends around the opening 62 for receiving the end of the strap 40. The annular member 74 includes at outwardly extending flange 76. The purpose of the flange 76 will be explained in more detail below.

Figure 6:
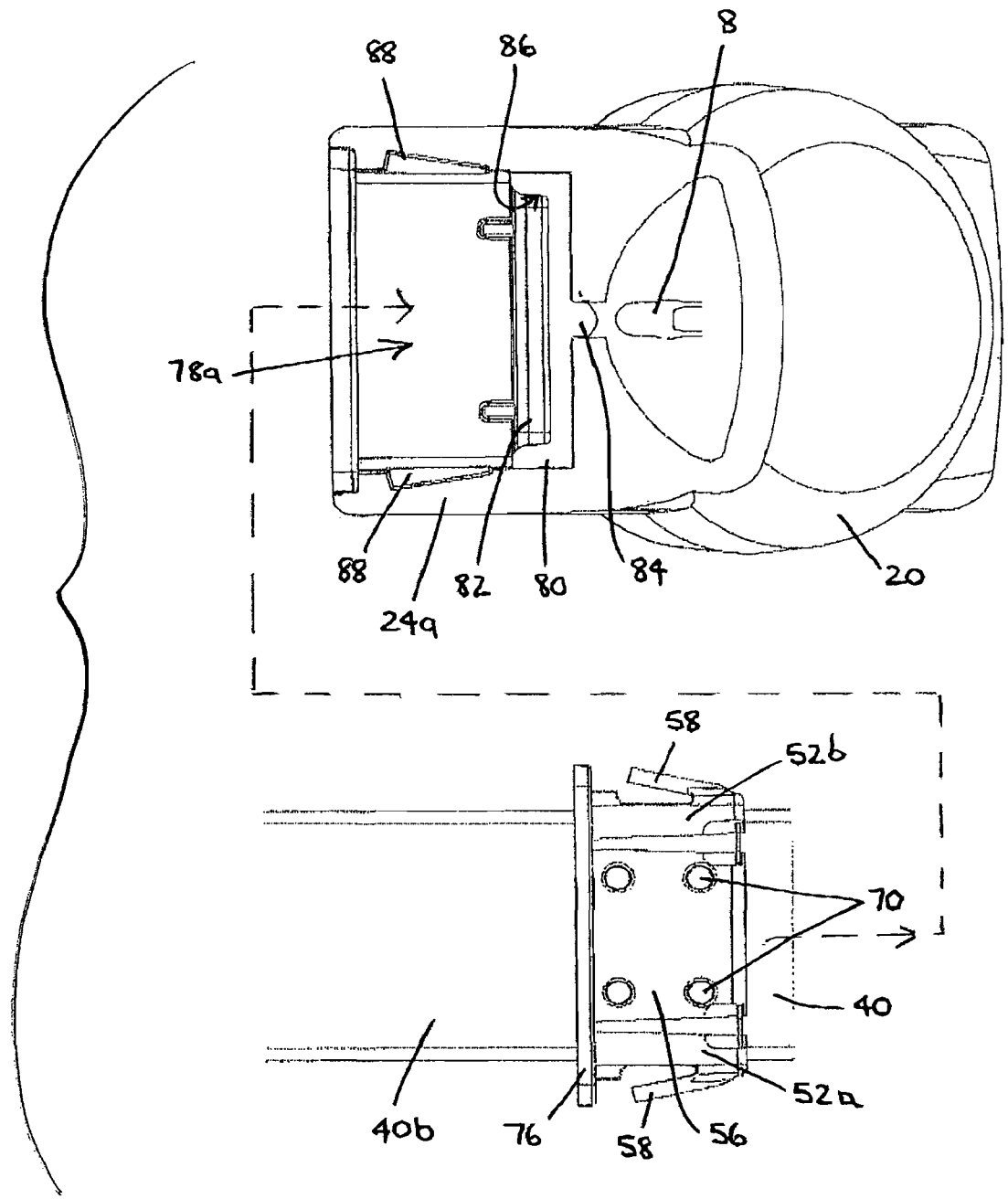
FIG. 6 is a top view showing how the flexible elongate strap is secured to the monitoring tag of FIG. 1 (part of the monitoring tag is shown in cut away) using the clip.

The arms 24a and 24b include openings 78a and 78b that communicate with the central cavity 22 of the housing 20. The openings 78a and 78b are sized and shaped at their open ends to receive the clips 50 such that the ends of the strap 40 can be fixedly secured to the housing 40 around the item. FIG. 6 shows part of one of the arms 24a in cut out so that the internal features of the opening 78a can be seen. The self-contained transmitter module (not shown) is located inside the cavity 22 such that the optical transmitter 8 is accurately aligned with an optically-transparent plastics cap 80 that includes a recess 82 that is shaped and sized for receiving the end of the strap 40 that protrudes beyond the clip 50. The cap 80 is welded to the surrounding parts of the housing 20 to completely close the opening 78a and includes a curved lens part 84 that couples the optical signals from the optical transmitter 8 into the end of the optical fibre 44. Projection parts (not shown) of the cap 80 are received in corresponding apertures in the housing 20 for the purpose of better fixing the cap in the opening 78a. The cap located in the other arm 24b includes an identical lens part that couples the optical signals from the other end of the optical fibre 44 to the optical receiver (not shown). Each end of the compressible strap 40 is a compression interference fit in the recess 82 of the associated cap 80 so that an annular water-tight seal is established completely around the end of the strap 40 in the region denoted generally by the reference numeral 86 (also shown in FIG. 10). This prevents any liquid such as water, sweat or ink from being drawn through the gap between the cap 80 and the end of the strap 40 by capillary action and then collecting between the end of the optical fibre 44 and the lens part 84 of the cap. If liquid is allowed to collect in this area then it can be drawn up the optical fibre, again by capillary action, where it can cause serious damage. The liquid also interferes with the transmission and receipt of the optical signals and can produce false triggers in the optical tamper detection circuit.

The barbs 58 provided on the edge parts 52a and 52b of the clip are designed for one-way snap-fit engagement with locking recesses 88 that are formed in opposite inner side surfaces of the openings 78a and 78b. These locking recesses 88 can be seen in FIG. 6. Once the clip 50 has been inserted into an opening in one of the arms and the barbs 58 have engaged with the corresponding locking recesses 88 then the barbs cannot be disengaged unless the clip 50 is broken apart. Frangible regions 90 located between the edge parts 52a and 52b of the clip 50 and the first and second plate parts 54 and 56 provide the primary mode of failure if a force is applied to the strap 40 to try and pull the ends of the strap away from the housing 20.

Figure 7:
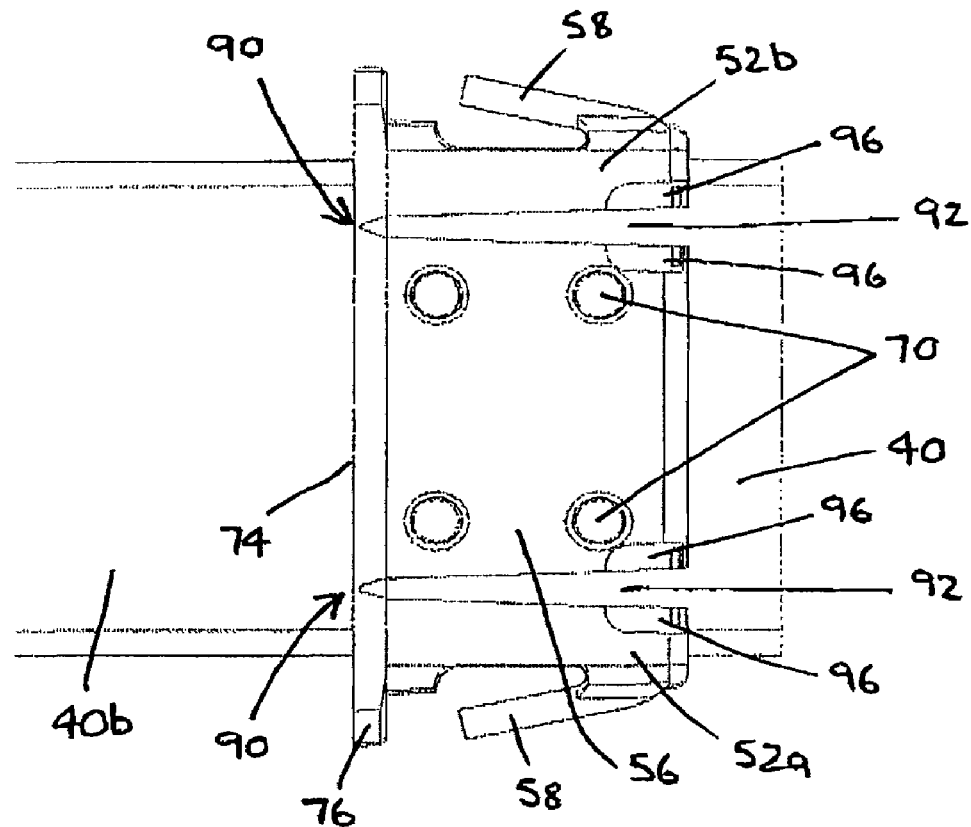
FIG. 7 is a top view showing frangible regions of the clip.
Figure 8:
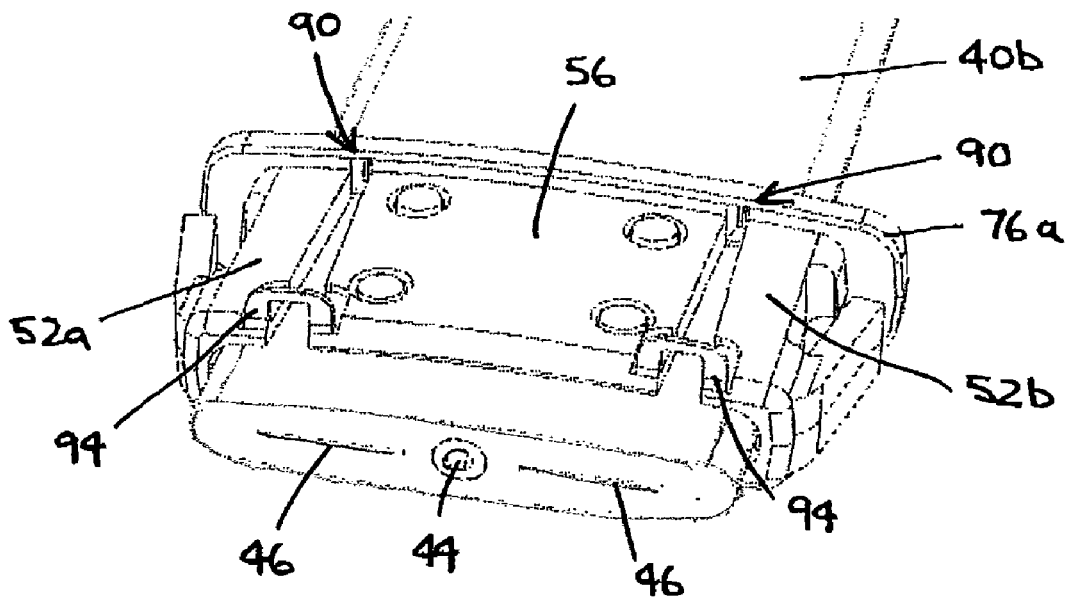
FIG. 8 is an end perspective view showing the frangible regions of the clip.

The frangible regions 90 will be described in more detail with reference to FIGS. 7 and 8. The frangible regions 90 extend from the ends of v-shaped channels 92 that are formed between the edge parts 52a and 52b and the first and second plate parts 54 and 56. In other words, the edge parts 52a and 52b and the first and second plate parts 54 and 56 are only connected together by the annular member 74 and the flange 76 and these are narrowed in the regions adjacent the ends of the v-shaped channels 92. The narrowing is shown in FIG. 7 by the dashed line that extends into the annular member 74 and the flange 76. If the clip 50 is viewed from any direction other than that shown generally in FIG. 8 then the frangible regions cannot be seen. (For example, the frangible regions 90 cannot be seen in FIG. 5, which shows the end of the clip 50 that is visible in use.) This is because the outer surface 76a of the flange is continuous and the frangible regions 90 are defined by channels Or recesses that are spaced inwardly from the outer surface of the flange.

To protect the frangible regions 90 and provide additional strength and rigidity to the clips 50 as they are inserted into the openings in the arms of the housing 20, thin u-shaped webs 94 are provided between the edge parts 52a and 52b and the second plate part 56. These webs 94 are folded down into suitably shaped recesses 96 in the edge parts 52a and 52b and the second plate part 56 when the clips 50 are inserted into the openings in the housing. The process of folding the webs 94 effectively destroys their structural integrity so that they are easily broken if sufficient force is applied to the strap 40 to break the frangible regions 90.

The thickness and shape of the frangible regions 90 can be altered to provide different breaking characteristics as required. The frangible regions should be strong enough so that they do not break when the monitoring tag is being worn normally. However, they must break when a predetermined level of force is applied to the strap. This force can be applied as a result of an individual tampering with the strap 40 in an attempt to remove the monitoring tag, by the relevant authorities when the monitoring tag is removed legitimately, or in an emergency situation such as if the strap gets caught in a moving vehicle or object, for example.

Because the frangible regions 90 extend through a part of the clip that is visible in use, it means that the clip 50 cannot be glued back together or otherwise repaired without this being immediately evident to an observer. For example, it will be clear from FIG. 5 that if one or more of the frangible regions are broken then cracks, breaks or other tamper-evident features will appear in the visible end face of the annular member 74 and the flange 76.

Figure 9:
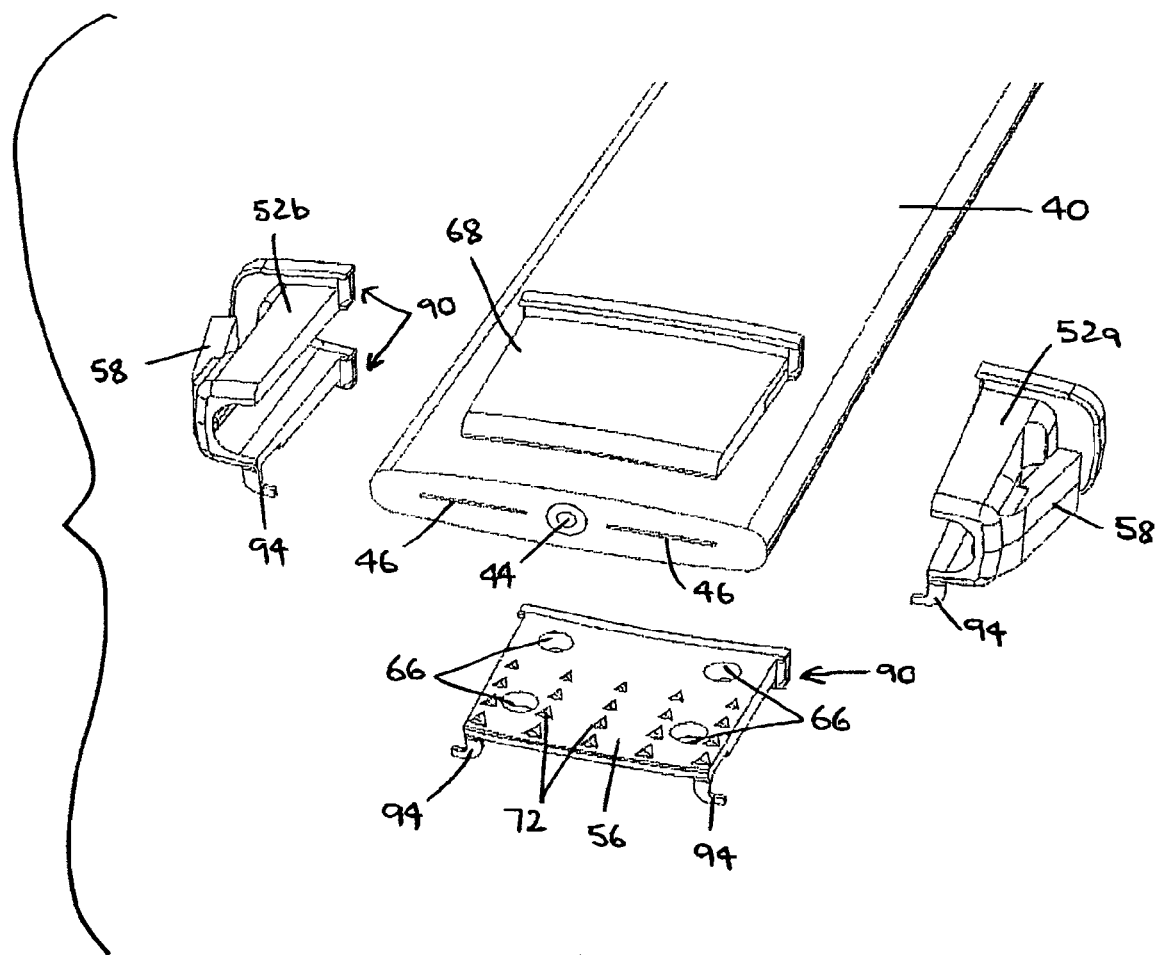
FIG. 9 is a perspective view showing the clip after the frangible regions have been broken.

If sufficient force is applied to the strap 40 then the frangible regions 90 will break allowing the first plate part 54 and the second plate part 56 to separate from the edge parts 52a and 52b. The end of the strap 40 is therefore released from the housing 20. In practice, the first plate part 54 and the locking member 68 remain secured to the end of the strap 40 but the second plate part 56 will readily detach as shown in FIG. 9 because the pins 70 of the locking member 68 and the holes 66 in the second plate part 56 are a clearance fit. The edge parts 52a and 52b will remain at least temporarily inside the respective opening in the housing with the barbs 58 engaged with the locking recesses 88.

Figure 10:
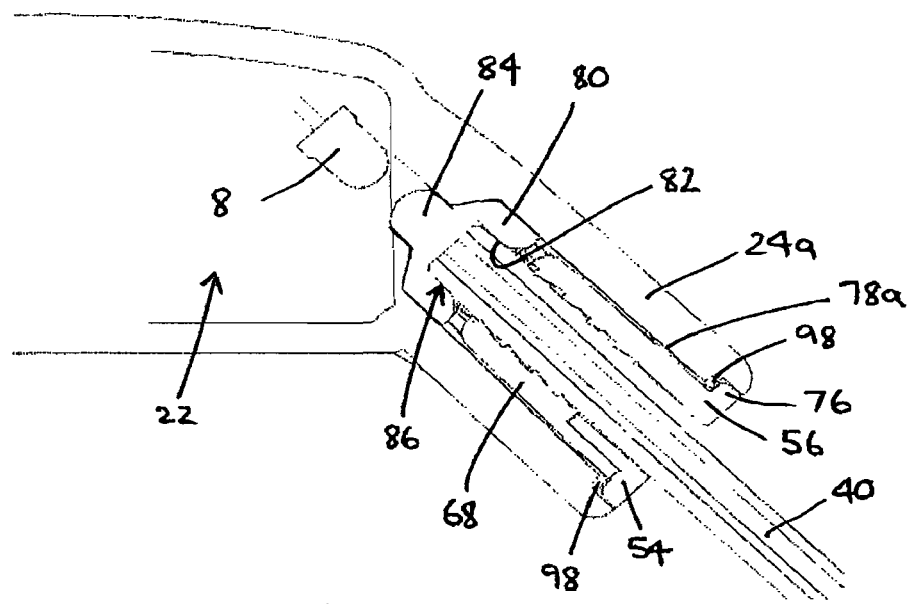
FIG. 10 is a cross section view through the monitoring tag showing how the clip is engaged with a part of the housing of the monitoring tag.
Figure 11:
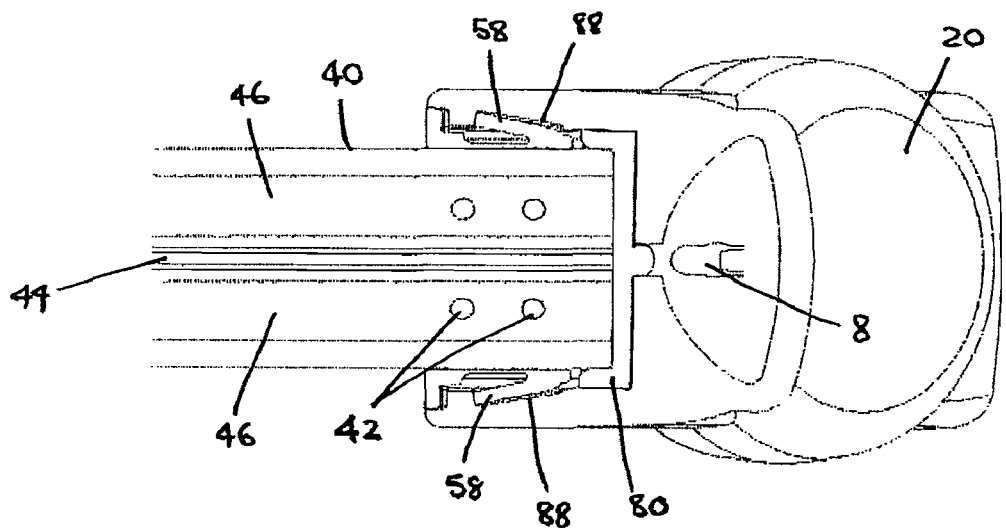
FIG. 11 is a perspective view showing how the clip is engaged with a part of the housing of the monitoring tag (the strap, clip and part of the housing are shown in cut away).

FIGS. 10 and 11 show a clip 50 that is engaged in the opening 78a in the arm 24a of the housing. The alignment between the optical fibre 44 the lens part 84 of the cap 80 and the optical transmitter 8 can be clearly noted. The flange 76 of the clip 50 is received in an annular recess 98 that extends around the mouth of the opening 78a. The addition of the flange 76 helps to prevent anyone from pushing a thin probe through the gap between the outside of the clip 50 and the inside surface of the opening 78a. The close interference fit between the end of the strap 40 that protrudes beyond the clip 50 and the cap 80 can also be seen. No liquid, dirt or debris can get past the cap 80 and into the central cavity 22 of the housing 20. It will be readily appreciated that instead of being welded across the opening, the cap can also be formed as an integral optically-transparent part of the housing itself. FIG. 10 also shows that the locking member 68 is inaccessible when the clip 50 is engaged in the opening 78a so that it cannot be tampered with or removed.

Figure 12:
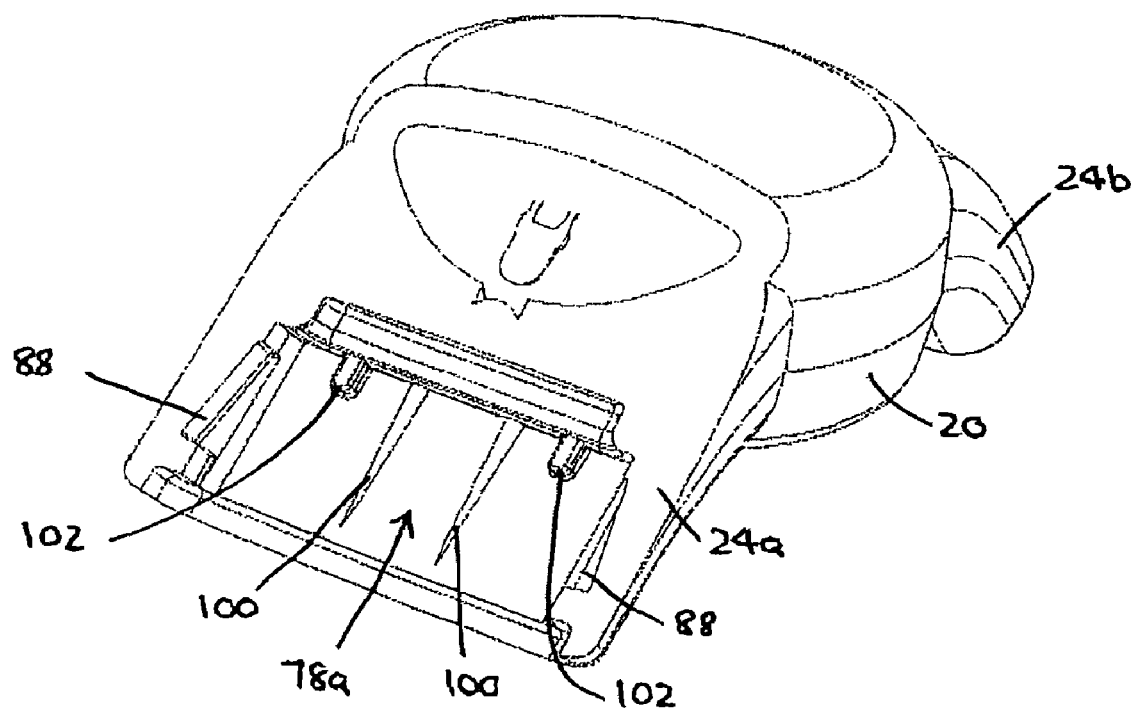
FIG. 12 is a perspective view showing features provided on the inside surface of the housing of the monitoring tag.
Figure 13:
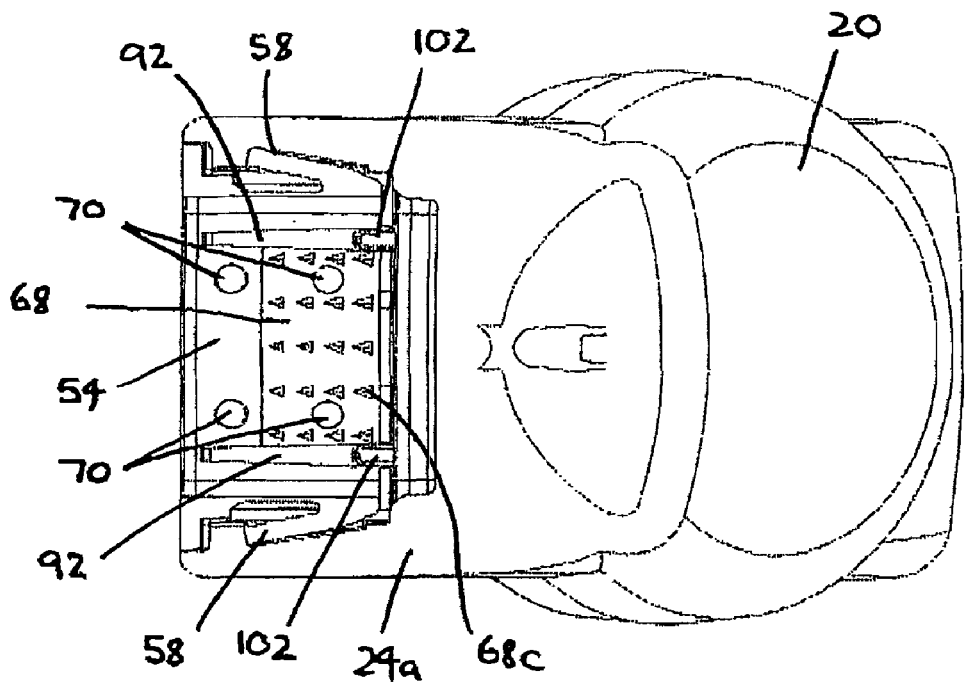
FIG. 13 is a perspective showing the features provided on the inside surface of the housing of the monitoring tag with the clip engaged (part of the monitoring tag is shown in cut away).

Two additional features of the openings 78a and 78b in the arms of the housing 20 can be seen with reference to FIGS. 12 and 13. The first feature is a pair of ramps 100 that are located on opposite surfaces (only one surface is shown in FIG. 12 but the other is the same) of the opening 78a. When a clip 50 is inserted into the opening 78a the ramps 100 progressively force the first and second plate parts 54 and 56 together so that the pattern of ridges or teeth 72 dig into the planar surfaces 40a and 40b of the strap to provide additional friction grip between the clip 50 and the strap 40. The force applied by the ramps 100 also helps to stop anyone from inserting a thin probe through the gap between the planar surfaces 40a and 40b of the strap and the first and second plate parts 54 and 56. The second feature is a series of ribs 102 that are located on the same opposite surfaces of the opening 78a and are received in the v-shaped channels 92 of the clip 50 when it is inserted into the opening. This is best seen in FIG. 13 where the first plate part 54 of the clip and the locking member 68 are shown in their engaged position. The ribs 102 help to position the clip 50 and provide support to the edge parts 52a and 52b of the clip when the monitoring tag is in use. More particularly, they prevent the v-shaped channels 92 from closing when a force is applied to the strap 40. Such a movement, if unchecked, might disengage the barbs 58 from their locking recesses 88 and release the clip or weaken the frangible regions 90.

While the present invention has been described in connection with a preferred embodiment, other modifications and applications will occur to those skilled in the art. For example, the number and spatial arrangement of pins 70 and corresponding receiving holes in the strap and clip can conceivably be varied in a manner which will suffice in usefulness, even if not being the preferred arrangement. The claims should therefore be interpreted to fairly cover all such modifications and applications within the true spirit and scope of the present invention.

What is claimed is:

1. A monitoring tag comprising:
a housing having a first opening;
an elongate flexible strap for securing the housing to an item, the strap having a first end and a second end; and
a first clip having first structure for fixedly securing the first clip to the first end of the strap and second structure for fixedly securing the first clip in the first opening and wherein the first securing structure and the second securing structure are connected together by a frangible region, so that once the first clip is fixedly secured in the first opening of the housing the first clip cannot be removed without breaking the frangible region which connects the first securing structure and the second securing structure.

2. The monitoring tag of claim 1, wherein the first clip has opposite edge parts and the second securing structure includes a pair of resilient barbs, one barb being located on each of the opposite edge parts.

3. The monitoring tag of claim 2, wherein a pair of oppositely facing locking recesses are formed on inside surfaces of the first opening in the housing and the pair of resilient barbs are adapted to have a one-way snap fit engagement with the locking recesses.

4. The monitoring tag of claim 1, wherein the first securing structure includes a separate locking member having at least one projection that is received through aligned holes in the first end of the strap and the first clip.

5. The monitoring tag of claim 4, wherein the first securing structure includes a first plate part having at least one hole and the at least one projection of the locking member is received as a friction fit through the at least one hole in the first plate part and through at least one aligned hole in the first end of the strap.

6. The monitoring tag of claim 5, wherein the first securing structure includes a second plate part positioned opposite the first plate part and having at least one hole for receiving the at least one projection of the separate locking member.

7. The monitoring tag of claim 6, wherein the locking member includes four projections arranged in a substantially rectangular configuration.

8. The monitoring tag of claim 7, wherein the second plate part of the first clip and the first end of the strap include four holes arranged in a substantially rectangular configuration for receiving the four projections of the separate locking member.

9. The monitoring tag of claim 8, wherein the first plate part of the clip includes two holes for receiving two of the four projections of the separate locking member.

10. The monitoring tag of claim 9, wherein the locking member is adapted to include a surface that comes into contact with a planar surface of the strap when the locking member is assembled to the first clip.

11. The monitoring tag of claim 10, wherein the surface of the locking member that comes into contact with the planar surface of the strap includes a plurality of members that grip the planar surface of the strap in use.

12. The monitoring tag of claim 11, wherein the second plate part is adapted to include a surface that comes into contact with a planar surface of the strap, and wherein the surface of the second plate part includes a plurality of members that grip the planar surface of the strap in use.

13. The monitoring tag of claim 12, wherein ramps are formed on inside surfaces of the first opening in the housing such that the plurality of gripping members on the contact surfaces of the locking member and the second plate part are forced into the planar surfaces of the strap with increasing force as the first clip is pushed into the first opening in the housing.

14. The monitoring tag of claim 4, wherein the strap includes a thermally inelastic elongated material selected from the group consisting of braid and tape and the at least one hole in the first end of the strap extends through an end part of the thermally inelastic elongated material.

15. The monitoring tag of claim 8, wherein the strap includes a first thermally inelastic elongated member and a second inelastic elongated member, a first two of the holes in the first end of the strap extending through an end part of the first thermally inelastic member and a second two of the holes in the first end of the strap extending through an end part of the second inelastic elongated member.

16. The monitoring tag of claim 6, wherein the frangible region of the first clip is defined by channels formed in parts of the first clip between the first securing structure and the second securing structure.

17. The monitoring tag of claim 16, wherein the channels are substantially v-shaped.

18. The monitoring tag of claim 16, wherein the first clip includes a first channel extending between one side of the second plate part and a first edge part of the first clip on which a barb is located, a second channel extending between the other side of the second plate part and a second edge part of the first clip on which a barb is located, a third channel extending between one side of the first plate part and the first edge part of the first clip and a fourth channel extending between the other side of the first plate part and the second edge part of the first clip.

19. The monitoring tag of claim 18, wherein the first clip further comprises a peripheral flange that extends completely around an opening for receiving the first end of the strap and wherein the four channels extend up to and slightly into the flange.

20. The monitoring tag of claim 19, wherein the flange is formed in an end of the first clip that is visible when the clip is inserted into the first opening in the housing.

21. The monitoring tag of claim 20, wherein the first opening in the housing includes a peripheral recess for accommodating the flange.

22. The monitoring tag of claim 16, wherein ribs are formed on inside surfaces of the first opening in the housing such that the ribs are received in the channels when the first clip is inserted into the first opening.

23. The monitoring tag of claim 16, wherein the channels are bridged by thin webs at a point spaced apart from the frangible region.

24. The monitoring tag of claim 18, wherein a first generally u-shaped web extends across the first channel from one side of the second plate part to the first edge part of the clip and a second generally u-shaped web extends across the second channel from the other side of the second plate part to the second edge part of the clip.

25. The monitoring tag of claim 24, wherein the webs are adapted to extend substantially perpendicular to the outer surface of the second plate part.

26. The monitoring tag of claim 1, wherein the second end of the strap is fixedly secured directly to a part of the housing.

27. The monitoring tag of claim 1, wherein the housing includes a second opening and the monitoring tag further comprises a second clip having first structure for fixedly securing the second clip to the second end of the strap and second structure for fixedly securing the second clip in the second opening and wherein the first securing structure and the second securing structure are connected together by a frangible region.

28. A monitoring tag comprising:
a housing having an opening; and
a strap having an end, wherein an annular water-tight seal is established completely around the end of the strap by a providing an interference compression fit of the end of the strap into the opening in the housing.

29. A monitoring tag comprising:
a housing having an opening;
a strap haying an end; and
a cap for receiving the end of the strap, wherein the cap is welded to the housing inside the opening and an annular water-tight seal is established completely around the end of the strap by a providing an interference compression fit of the end of the strap into the cap.

30. The monitoring tag of claim 29, wherein the cap is optically-transparent.

31. The monitoring tag of claim 29, wherein the cap includes a curved lens part.

32. A monitoring tag comprising:
a housing having a first opening;
an elongate flexible strap for securing the housing to an item, the strap having a first end and a second end and incorporating a thermally inelastic elongated material, selected from the group consisting of thread, yarn, tape and braid, which is mechanically bonded to surrounding material of the strap; and
a first clip having first structure for fixedly securing the first clip to the first end of the strap and second structure for fixedly securing the first clip in the first opening and wherein the first securing structure and the second securing structure are connected together by a frangible region, so that once the first clip is fixedly secured in the first opening of the housing the first clip cannot he removed without breaking the frangible region which connects the first securing structure and the second securing structure.

* * * * *